(12) United States Patent
Mesic et al.

(10) Patent No.: US 10,826,925 B2
(45) Date of Patent: Nov. 3, 2020

(54) CONSOLIDATED ENTERPRISE VIEW OF CYBERSECURITY DATA FROM MULTIPLE SITES

(71) Applicant: Honeywell International Inc., Morris Plains, NJ (US)

(72) Inventors: Thomas M. Mesic, London (CA); Seth G. Carpenter, Phoenix, AZ (US); Scott Woods, Cave Creek, AZ (US); Eric D. Knapp, Milton, NH (US)

(73) Assignee: Honeywell International Inc., Morris Plains, NJ (US)

( * ) Notice: Subject to any disclaimer, the term of this patent is extended or adjusted under 35 U.S.C. 154(b) by 98 days.

(21) Appl. No.: 15/582,265

(22) Filed: Apr. 28, 2017

(65) Prior Publication Data

US 2018/0316703 A1 Nov. 1, 2018

(51) Int. Cl.
*H04L 29/06* (2006.01)
*G06F 16/27* (2019.01)
*G06F 21/00* (2013.01)

(52) U.S. Cl.
CPC .......... *H04L 63/1425* (2013.01); *G06F 16/27* (2019.01); *G06F 21/00* (2013.01); *H04L 63/20* (2013.01); *H04L 63/029* (2013.01)

(58) Field of Classification Search
CPC . H04L 63/20; H04L 63/1425; H04L 63/1408; H04L 63/0263
See application file for complete search history.

(56) References Cited

U.S. PATENT DOCUMENTS

| | | | |
|---|---|---|---|
| 9,838,407 B1* | 12/2017 | Oprea | H04L 63/1416 |
| 2002/0002603 A1* | 1/2002 | Vange | G06F 9/5027 709/219 |
| 2005/0015624 A1* | 1/2005 | Ginter | G06F 21/55 726/4 |
| 2009/0024663 A1 | 1/2009 | McGovern | |
| 2010/0324945 A1 | 12/2010 | Hessing | |
| 2011/0162073 A1 | 6/2011 | Jeschke et al. | |
| 2014/0245451 A1 | 8/2014 | Le Sant | |
| 2014/0278790 A1* | 9/2014 | Wolff | G06Q 30/0201 705/7.32 |
| 2015/0074749 A1* | 3/2015 | Vasko | G05B 19/4185 726/1 |
| 2016/0085972 A1* | 3/2016 | Luo | H04L 63/08 713/153 |
| 2016/0234251 A1* | 8/2016 | Boice | H04L 63/20 |
| 2016/0320435 A1 | 11/2016 | Budhraja et al. | |

(Continued)

OTHER PUBLICATIONS

Gerhards, "The Syslog Protocol", Network Working Group, RFC 5424, Mar. 2009, 38 pages.

(Continued)

*Primary Examiner* — Daniel B Potratz

(57) ABSTRACT

This disclosure provides an apparatus and method for a consolidated enterprise view of cybersecurity data from multiple sites, including but not limited to in industrial control systems and other systems. A method includes receiving, by a replicator system, cybersecurity data from a site risk manager (RM) database. The method includes transferring the cybersecurity data, by the replicator system, through a secure firewall to an enterprise RM database. The enterprise RM database consolidates data received from a plurality of replicator systems.

14 Claims, 3 Drawing Sheets

(56) References Cited

U.S. PATENT DOCUMENTS

| | | | |
|---|---|---|---|
| 2017/0093910 A1* | 3/2017 | Gukal | H04L 63/1416 |
| 2017/0126740 A1* | 5/2017 | Bejarano Ardila | H04L 63/14 |
| 2018/0083982 A1* | 3/2018 | Asenjo | H04L 63/20 |
| 2018/0159876 A1* | 6/2018 | Park | G06F 16/9024 |

OTHER PUBLICATIONS

Knapp, "Security Intelligence and Analytics in Industrial Systems", Honeywell Users Group Europe, Middle East and Africa, 2014, 29 pages.

Koelemij, "Effective Defense in Depth Strategies for Industrial Control Systems", Honeywell Users Group Europe, Middle East and Africa, 2014, 21 pages.

Koelemij, "Designing a Secure Industrial Control System", Honeywell Users Group EMEA, Industrial IT Solutions, 2013, 11 pages.

Koelemij, "Making Cyber Security S.M.A.R.T.", Honeywell Industrial Cyber Security, EMEA HUG Training Session, 2014, 63 pages.

Ricks, "System Center 2012 R2 Operations Manager Documentation", Microsoft System Center 2012 R2, Nov. 2013, 1389 pages.

Spear, "Industrial Cyber Security 101", Honeywell Users Group Europe, Middle East and Africa, 2015, 25 pages.

"Certification Testing Specification", OPC Foundation, Release Candidate 1.02, May 2014, 20 pages.

"Guide for Conducting Risk Assessments—Information Security", NIST Special Publication 800-30, Revision 1, NIST, U.S. Dept of Commerce, Sep. 2012, 95 pages.

"Honeywell Industrial Cyber Security Overview and Managed Industrial Cyber Security Services", Honeywell Process Solutions, Jun. 2014, 19 pages.

"Information Technology—Security Techniques—Information Security Risk Management", BSI Standards Publication BS ISO/IEC 27005, 2011, 80 pages.

"Risk Management and Critical Infrastructure Protection: Assessing, Integrating, and Managing Threats, Vulnerabilities and Consequences", CRS Report for Congress, RL32561, Feb. 2005, 28 pages.

"Security for Industrial Automation and Control Systems Part 2-3: Patch Management in the IACS Environment", ISA-TR62443-2-3-2015, Jul. 2015, 18 pages.

"Design and Planning Guide for System Center 2012—Operations Manager", Microsoft System Center 2012, Apr. 2012, 13 pages.

International Search Report and Written Opinion of the International Searching Authority for International Patent Application No. PCT/US2018/028841 dated Aug. 7, 2018, 11 pages.

* cited by examiner

CONSOLIDATED ENTERPRISE VIEW OF CYBERSECURITY DATA FROM MULTIPLE SITES

TECHNICAL FIELD

This disclosure relates generally to network security. More specifically, this disclosure relates to an apparatus and method for assessing cybersecurity risks across multiple systems or locations.

BACKGROUND

Processing facilities are often managed using industrial process control and automation systems. Conventional control and automation systems routinely include a variety of networked devices, such as servers, workstations, switches, routers, firewalls, safety systems, proprietary real-time controllers, and industrial field devices. Often times, this equipment comes from a number of different vendors. In industrial environments, cyber-security is of increasing concern, and unaddressed security vulnerabilities in any of these components could be exploited by attackers to disrupt operations or cause unsafe conditions in an industrial facility. To detect or report a threat, it is often useful to efficiently and effectively monitor data from multiple sites or locations at a single system.

SUMMARY

This disclosure provides an apparatus and method for consolidated enterprise view of cybersecurity data from multiple sites, including but not limited to in industrial control systems and other systems. A method includes receiving, by a replicator system, cybersecurity data from a site risk manager (RM) database. The method includes transferring the cybersecurity data, by the replicator system, through a secure firewall to an enterprise RM database. The enterprise RM database consolidates data received from a plurality of replicator systems.

Disclosed embodiments include a system comprising a controller and a memory, configured to perform processes as described herein. Disclosed embodiments also include a non-transitory machine-readable medium encoded with executable instructions that, when executed, cause one or more processors of a system to perform processes as disclosed herein.

In various embodiments, a site RM system collects the cybersecurity data from a plurality of devices in an industrial control system and stores the cybersecurity data in the site RM database. In various embodiments, an enterprise RM system displays a dashboard according to the consolidated data received from the plurality of replicator systems. In various embodiments, the replicator system is implemented by a site RM system. In various embodiments, the replicator system implements a structured query language (SQL) agent or implements an extractor service that extracts data from the site RM database. In various embodiments, the cybersecurity data is transferred to the enterprise RM database via a listener that detects transactions from the replicator system.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
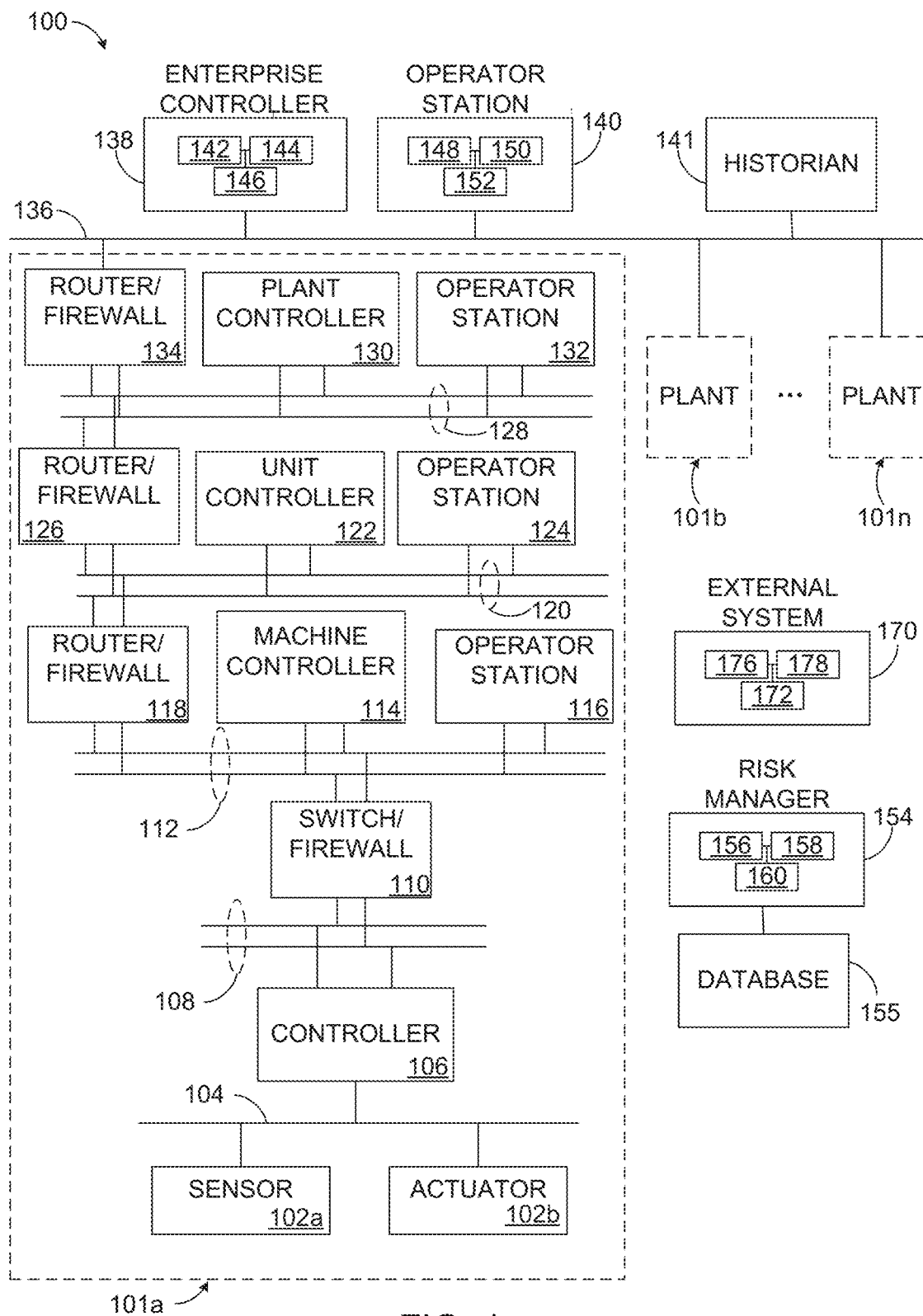
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

As noted above, cyber-security is of increasing concern with respect to industrial process control and automation systems. Disclosed embodiments include systems and methods that provide a holistic view of cyber-security data even across systems, sites, or network levels with different access controls. This is accomplished, in some embodiments, using an secure data replication and publication from one or more site risk manager systems to an enterprise risk manager system. Note that the "enterprise" risk manager system does not necessarily require that it be enterprise-level from a business standpoint, but rather indicates that the enterprise risk manager system can collect, analyze, and present data from multiple site risk manager systems.

Disclosed embodiments can be used in conjunction with commercial software and services, including but not limited to the HONEYWELL Industrial Enterprise Risk Manager (ERM) software application, for example executing on the enterprise risk manager system, and the commercially available HONEYWELL Industrial Cybersecurity Risk Manager (RM) software application, for example executing on the site risk manager systems.

The processes and results described herein can be accomplished (among other ways) using a risk manager 154. Among other things, the risk manager 154 supports a technique for replication of identity-derived primary keys without range restrictions.

In this example, the risk manager 154 includes one or more processing devices 156; one or more memories 158 for storing instructions and data used, generated, or collected by the processing device(s) 156; and at least one network interface 160. Each processing device 156 could represent a microprocessor, microcontroller, digital signal process, field programmable gate array, application specific integrated circuit, or discrete logic. Each memory 158 could represent a volatile or non-volatile storage and retrieval device, such as a random access memory or Flash memory. Each network interface 160 could represent an Ethernet interface, wireless transceiver, or other device facilitating external communication. The functionality of the risk manager 154 could be implemented using any suitable hardware or a combination of hardware and software/firmware instructions. In some embodiments, the risk manager 154 includes, or is communication with, a database 155. The database 155 denotes any suitable structure facilitating storage and retrieval of information.

Disclosed embodiments enable the consolidation of risk manager data from a system such as the risk manager 154. The analysis and reporting can also or alternatively be accessed or performed, in some cases, by an external system 170. In this example, the external system 170 includes one or more processing devices 176; one or more memories 178 for storing instructions and data used, generated, or collected by the processing device(s) 176; and at least one network interface 172. Each processing device 176 could represent a microprocessor, microcontroller, digital signal process, field programmable gate array, application specific integrated circuit, or discrete logic. Each memory 178 could represent a volatile or non-volatile storage and retrieval device, such as a random access memory or Flash memory. Each network interface 172 could represent an Ethernet interface, wireless transceiver, or other device facilitating external communication. The functionality of the external system 170 could be implemented using any suitable hardware or a combination of hardware and software/firmware instructions. The external system 170 can be, for example, a stand-alone data processing system, a mobile device, an external server or enterprise system, or otherwise. The exemplary structure of the external system 170 described above is not intended to limit the structure or function of the devices that could be used to implement the external system 170, In various embodiments, one or more external systems 170 can act as the site risk manager systems when the enterprise risk manager system is implemented as risk manager 154. Conversely, one or more external systems 170 can act as the enterprise risk manager system when the site risk manager system(s) is implemented as risk manager 154.

Although FIG. 1 illustrates one example of an industrial process control and automation system 100, various changes may be made to FIG. 1, For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which the functions of the risk manager 154 can be used. This functionality can be used in any other suitable device or system.

Companies that use industrial control systems (ICS) in their plant operations, usually adopt a network security architecture that divides the ICS network into zones, or levels, whereby each level adheres to strict policies specifying from which other levels it will accept data flows.

Often, company personnel, acting as decision makers, do not have direct access to certain network levels where key data resides data which is required to carry out effective decision making by those select personnel. Therefore, critical data that is required by decision makers which is generated at levels possessing restricted access policies will commonly be shared (i.e. copied or replicated) to applications residing on levels with less restrictive policies so that it can be securely accessed.

Disclosed embodiments provide a mechanism for sharing data across network levels while adhering to the strict security architecture requirements commonly adopted by the industry.

Disclosed embodiments enable company personnel that only possess access to the enterprise risk manager system (such as at a corporate level) to view data generated by site risk manager systems executing within the more highly restricted manufacturing operations and control level. The enterprise risk manager (ERM) system can execute in the corporate level in various embodiments.

Disclosed embodiments can adhere to strict network security policies adopted by companies that use ICS systems while providing direct database-to-database replication of data from multiple site risk manager systems to the enterprise risk manager system.

Figure 2:
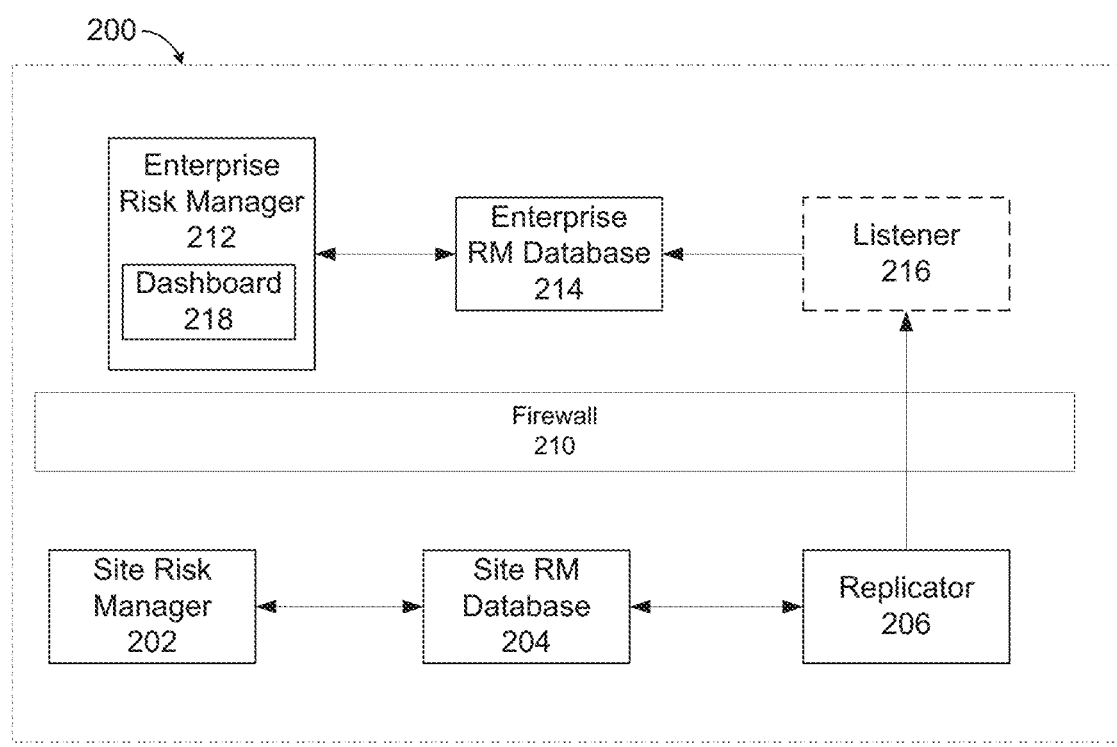
FIG. 2 illustrates a system for consolidation of cybersecurity data from multiple sites, in accordance with disclosed embodiments.

FIG. 2 illustrates a system 200 for consolidation of cybersecurity data from multiple sites, in accordance with disclosed embodiments.

In this example, system 200 shows a single example of a site risk manager 202 and associated components, but those of skill in the art will recognize that, in a typical implementation, enterprise risk manager system 212 will consolidate data from a plurality of site risk manager systems 202.

In this example, a site RM system 202, which can be implemented by an RM 154, is in communication with a site RM database 204, which can be implemented by a database 155. Similarly, an enterprise RM system 212, which can be implemented by an RM 154 is in communication with an enterprise RM database 214, which can be implemented by a database 155. Of course, any of these databases can be implemented as a single database or as multiple databases.

System 200 consolidates cybersecurity data from multiple site RM databases 204, preferably using a one-way communication through a firewall 210.

Replicator system 206 collects data for replication from site RM database 204 for transmission through firewall 210. Replicator system 206 can be implemented as a data processing system or other device, similar to risk manager 154, with one or more memories, controllers, and other components as will be recognized by those of skill in the art. Replicator system 206 can be implemented as a process executing on site risk manager 202.

In some embodiments, replicator system 206 implements a structured query language (SQL) agent that reads the data from site RM database 204, for example using extraction, transformation, and load (ETL) packages for data warehousing, as understood by those of skill in the art. Data read from site RM database 204 by replicator system 206 can be transferred through firewall 210 using, for example, a specified Transmission Control Protocol (TCP) port and forced encryption. The encryption can be certificate or key pair-based, ensuring both secure encryption and authentication of both the sender and receiver.

In some cases, the data from replicator system 206 is transferred through firewall 210 directly to enterprise RM database 214. In other cases, an optional listener 216 can be used to "listen" for or detect transactions from replicator system 206 and transfer the received data to enterprise RM database 214.

In some embodiments, replicator system 206 implements a MICROSOFT WINDOWS service or similar extractor service that extracts the data from site RM system 202 or site RM database 204 and transfers the data through firewall 210. The listener 216 can be similarly implemented as a MICROSOFT WINDOWS service that "listens" to a specific port of firewall 210, collects the transferred data, and transfers the data to enterprise RM system 212 or enterprise RM database 214.

The data from multiple site RM databases 204 can be consolidated in enterprise RM database 214. Enterprise RM system 212 can then analyze, manipulate, correlate, and perform other processes on the data, and can display some or all of the consolidated data in a dashboard 218.

Any of the communications described herein can be performed over any combination of public or private networks, including the Internet.

Figure 3:
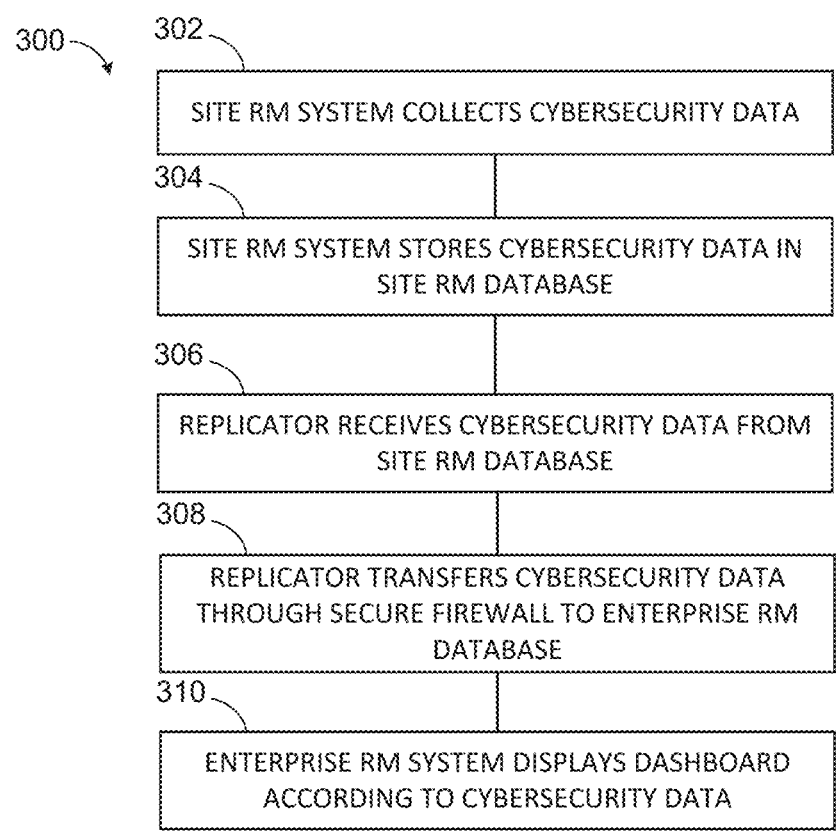
FIG. 3 illustrates a process in accordance with disclosed embodiments.

FIG. 3 illustrates a process 300 in accordance with disclosed embodiments, as can be performed by data processing systems of a system 200 as described herein.

A site RM system 202 collects cybersecurity data from a plurality of devices (302). The devices can be any of the devices or elements discussed with respect to FIG. 1 above.

The site RM system 202 stores the cybersecurity data in a site RM database 204 (304).

A replicator system 206 receives the cybersecurity data from site RM database 204 (306). This can be performed as described herein, such as by extractions by an SQL agent or being read by a service, from site RM database 204 directly or through site RM system 202.

The replicator system 206 transfers the cybersecurity data through a secure firewall 210 to an enterprise RM database 214 (308). This transfer can be directly to the enterprise RM database 214 or to RM database 214 via enterprise risk manager 212, and can optionally go through a listener 216 as described herein.

Enterprise RM system 212 displays a dashboard 218 according to the cybersecurity data (310). This can include consolidating data from multiple site RM systems 202, and performing other analysis or processing on the cybersecurity data as described herein or known to those of skill in the art.

Disclosed embodiments provide a number of technical advantages and improvements to known devices and systems. Disclosed embodiments provide efficient, direct database to database replication of data generated from site risk manager systems to the enterprise risk manager system. This can be accomplished, for example using the capabilities of the MICROSOFT SQL SERVER transactional data replication software products. Disclosed embodiments can ensure that the data is re-created in the exact order necessary to reflect an identical copy of the site source data in the enterprise risk manager system. Disclosed embodiments provide reliable messaging of the data and ensure that no data is lost or skipped over during the replication process/

Disclosed embodiments enforce key network security requirements, such as one-way direct data transfer from the site risk manager systems to the enterprise risk manager system. Disclosed embodiments can include one-way data transfer from the site risk manager systems to the enterprise risk manager system via an intermediate relay node residing in a "DMZ" level using data packet forwarding techniques.

Disclosed embodiments can include secured transfer of data across levels by enforcing encryption on the TCP channel. In various embodiments, data arriving and stored at the enterprise risk manager system database is "secured at rest" through the use of transparent data encryption techniques.

Various disclosed embodiments can include unique, auto-updating, end-user displays highlighting key cybersecurity information about the site risk manager systems, supporting easy, at-a-glance, visual comparisons of the site risk manager systems.

Disclosed embodiments improve application performance because of the direct database to database data transfers and improve application robustness by use of reliable messaging as part of transactional replication, which can tolerate network outages without losing or skipping over data. Disclosed embodiments improve maintainability of application computer code by exploiting commercially-available replication components rather than developing and maintaining custom data transfer components.

Note that the risk manager 154, the replicator system, the RM systems, and/or the other processes, devices, and techniques described herein could use or operate in conjunction with any combination or all of various features described in the following previously-filed patent applications (all of which are hereby incorporated by reference):

U.S. patent application Ser. No. 14/482,888 entitled "DYNAMIC QUANTIFICATION OF CYBER-SECURITY RISKS IN A CONTROL SYSTEM";

U.S. Provisional Patent Application No. 62/036,920 entitled "ANALYZING CYBER-SECURITY RISKS IN AN INDUSTRIAL CONTROL ENVIRONMENT";

U.S. Provisional Patent Application No. 62/113,075 entitled "RULES ENGINE FOR CONVERTING SYSTEM-RELATED CHARACTERISTICS AND EVENTS INTO CYBER-SECURITY RISK ASSESSMENT VALUES" and corresponding non-provisional U.S. patent application Ser. No. 14/871,695;

U.S. Provisional Patent Application No. 62/113,221 entitled "NOTIFICATION SUBSYSTEM FOR GENERATING CONSOLIDATED, FILTERED, AND RELEVANT SECURITY RISK-BASED NOTIFICATIONS" and corresponding non-provisional U.S. patent application Ser. No. 14/871,521;

U.S. Provisional Patent Application No. 62/113,100 entitled "TECHNIQUE FOR USING INFRASTRUCTURE MONITORING SOFTWARE TO COLLECT CYBER-SECURITY RISK DATA" and corresponding non-provisional U.S. patent application Ser. No. 14/871,855;

U.S. Provisional Patent Application No. 62/113,186 entitled "INFRASTRUCTURE MONITORING TOOL FOR COLLECTING INDUSTRIAL PROCESS CONTROL AND AUTOMATION SYSTEM RISK DATA" and corresponding non-provisional U.S. patent application Ser. No. 14/871,732;

U.S. Provisional Patent Application No. 62/113,165 entitled "PATCH MONITORING AND ANALYSIS" and corresponding non-provisional U.S. patent application Ser. No. 14/871,921;

U.S. Provisional Patent Application No. 62/113,152 entitled "APPARATUS AND METHOD FOR AUTOMATIC HANDLING OF CYBER-SECURITY RISK EVENTS" and corresponding non-provisional U.S. patent application Ser. No. 14/871,503;

U.S. Provisional Patent Application No. 62/114,928 entitled "APPARATUS AND METHOD FOR DYNAMIC CUSTOMIZATION OF CYBER-SECURITY RISK ITEM RULES" and corresponding non-provisional U.S. patent application Ser. No. 14/871,605;

U.S. Provisional Patent Application No. 62/114,865 entitled "APPARATUS AND METHOD FOR PROVIDING POSSIBLE CAUSES, RECOMMENDED ACTIONS, AND POTENTIAL IMPACTS RELATED TO IDENTIFIED CYBER-SECURITY RISK ITEMS" and corresponding non-provisional U.S. patent application Ser. No. 14/871,814; and U.S. Provisional Patent Application No. 62/114,937 entitled "APPARATUS AND METHOD FOR TYING CYBER-SECURITY RISK ANALYSIS TO COMMON RISK METHODOLOGIES AND RISK LEVELS" and corresponding non-provisional U.S. patent application Ser. No. 14/871,136; and U.S. Provisional Patent Application No. 62/116,245 entitled "RISK MANAGEMENT IN AN AIR-GAPPED ENVIRONMENT" and corresponding non-provisional U.S. patent application Ser. No. 14/871,547.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving, by each of a plurality of replicator systems that are each at a different one of a plurality of sites, cybersecurity data from a corresponding one of a plurality of site risk manager (RM) databases, wherein the corresponding site RM database is situated at a same site as the receiving replicator system, wherein the site RM database is at a first network level and the cybersecurity data is collected from a second network level different from the first network level, wherein the first and second network levels each possess restricted access policies;
implementing a structure query language (SQL) agent to analyze the cybersecurity data using extraction, transformation, and load (ETL) packages for data warehousing;
transferring the cybersecurity data using a specific protocol and forced encryption, the encryption is based on at least one certificate or key pair to ensure the encryption and authentication of both the sender and receiver, by each of the plurality of replicator systems, using one-way communication through a secure firewall to an enterprise RM database, wherein the enterprise RM database consolidates data received from the plurality of replicator systems, wherein the consolidated data in the enterprise RM databases is accessible to users who are unable to access the first and second network levels;
detecting transactions from the replicator systems to the enterprise RM database using a listener, wherein the listener is configured to listen to a specific port of the secure firewall; and
collecting the transferred cybersecurity data and transfer the transferred cybersecurity data to the enterprise RM database.

2. The method of claim 1, wherein the cybersecurity data is collected from a plurality of devices in an industrial control system and stores the cybersecurity data in the site RM database.

3. The method of claim 1, wherein an enterprise RM system displays a dashboard according to the consolidated data received from the plurality of replicator systems.

4. The method of claim 1, wherein each replicator system of the plurality of replicator systems is implemented by a site RM system.

5. The method of claim 1, further comprising:
implementing, by each of the plurality of replicator systems, an extractor service that extracts data from the corresponding site RM database.

6. A replicator system comprising:
a controller; and
a memory operatively coupled to the controller, the controller configured to:
receive cybersecurity data from a site risk manager (RM) database, the site RM database is at a first network level and the cybersecurity data is collected from a second network level different from the first network level, wherein the first and second network levels each possess restricted access policies;
implement a structure query language (SQL) agent to analyze the cybersecurity data using extraction, transformation, and load (ETL) packages for data warehousing;
transfer the cybersecurity data using a specific protocol and forced encryption, the encryption is based on at least one certificate or key pair to ensure the encryption and authentication of both the sender and receiver, using one-way communication through a secure firewall to an enterprise RM database, wherein the enterprise RM database consolidates data received from a plurality of replicator systems, wherein the consolidated data in the enterprise RM databases is accessible to users who are unable to access the first and second network levels;
detect transactions from the replicator systems to the enterprise RM database using a listener, wherein the listener is configured to listen to a specific port of the secure firewall; and
collect the transferred cybersecurity data and transfer the transferred cybersecurity data to the enterprise RM database.

7. The replicator system of claim 6, wherein the controller collects the cybersecurity data from a plurality of devices in an industrial control system and stores the cybersecurity data in the site RM database.

8. The replicator system of claim 6, wherein an enterprise RM system displays a dashboard according to the consolidated data received from the plurality of replicator systems.

9. The replicator system of claim 6, wherein the replicator system is implemented by a site RM system.

10. The replicator system of claim 6, wherein the controller is further configured to implement an extractor service that extracts data from the site RM database, and transfers the extracted cybersecurity data through the secure firewall to the enterprise RM database.

11. A non-transitory machine-readable medium encoded with executable instructions that, when executed, cause one or more processors of a replicator system to:

maintain a data table associated with an identity-derived primary key (PK-i);

receive cybersecurity data from a site risk manager (RM) database, wherein the site RM database is at a first network level and the cybersecurity data is collected from a second network level different from the first network level, wherein the first and second network levels each possess restricted access policies;

implement a structure query language (SQL) agent to analyze the cybersecurity data using extraction, transformation, and load (ETL) packages for data warehousing;

transfer the cybersecurity data using a specific protocol and forced encryption, the encryption is based on at least one certificate or key pair to ensure the encryption and authentication of both the sender and receiver, using one-way communication through a secure firewall to an enterprise RM database, wherein the enterprise RM database consolidates data received from a plurality of replicator systems, wherein the consolidated data in the enterprise RM databases is accessible to users who are unable to access the first and second network levels;

detect transactions from the replicator systems to the enterprise RM database using a listener, wherein the listener is configured to listen to a specific port of the secure firewall; and collect the transferred cybersecurity data and transfer the transferred cybersecurity data to the enterprise RM database.

12. The non-transitory machine-readable medium of claim 11, wherein the cybersecurity data is collected from a plurality of devices in an industrial control system and stores the cybersecurity data in the site RM database.

13. The non-transitory machine-readable medium of claim 11, wherein an enterprise RM system displays a dashboard according to the consolidated data received from the plurality of replicator systems.

14. The non-transitory machine-readable medium of claim 11, wherein the replicator system is implemented by a site RM system.

* * * * *